United States Patent [19]

Pieverling

[11] 4,047,176

[45] Sept. 6, 1977

[54] METHOD FOR THE COMPARATIVE VECTOR MEASUREMENT OF SIGNAL PULSES ARRIVING NEARLY SIMULTANEOUSLY AT SEVERAL RADIO RECEIVING STATIONS

[75] Inventor: Klaus V. Pieverling, Wolfratshausen, Germany

[73] Assignee: Siemens Aktiengesellschaft, Berlin & Munich, Germany

[21] Appl. No.: 629,282

[22] Filed: Nov. 6, 1975

[30] Foreign Application Priority Data

Nov. 13, 1974 Germany .................. 2453904

[51] Int. Cl.² .................. G01S 1/44
[52] U.S. Cl. .................. 343/106 R; 325/400
[58] Field of Search .................. 343/106 R, 7 AG; 325/399, 402, 408, 411, 400

[56] References Cited

U.S. PATENT DOCUMENTS

| | | | |
|---|---|---|---|
| 3,305,787 | 2/1967 | Distler et al. | 343/106 R |
| 3,361,971 | 1/1968 | Eaves | 343/7 AG |
| 3,526,849 | 9/1970 | Dishal et al. | 343/106 R |
| 3,831,095 | 8/1974 | Mounce | 325/408 |

Primary Examiner—Maynard R. Wilbur
Assistant Examiner—T. M. Blum
Attorney, Agent, or Firm—Hill, Gross, Simpson, Van Santen, Steadman, Chiara & Simpson

[57] ABSTRACT

A method for the comparative vector measurement of keyed radio signal pulses, in particular Tacan pulses, arriving nearly simultaneously at several receiving stations and which can exhibit great level differences, in which, at each receiver, the pulses are initially fed to an amplifier or attenuator having amplification or attenuation, respectively, which can be adjusted in distinct steps, which reduction or increase takes place automatically with the rise of the leading edge of the respective signal pulse. After passing through the respective amplifier or attenuator of the receivers, the instantaneous amplitudes of the measuring signals are measured at a fixed measuring time common to all receivers. In each receiver a second measuring signal is produced which is in phase quadrature with respect to the aforementioned measuring signal, the instantaneous amplitude of the second measuring signal being measured at the same time as the first measuring signal.

10 Claims, 30 Drawing Figures

METHOD FOR THE COMPARATIVE VECTOR MEASUREMENT OF SIGNAL PULSES ARRIVING NEARLY SIMULTANEOUSLY AT SEVERAL RADIO RECEIVING STATIONS

CROSS REFERENCE TO RELATED APPLICATION

This application is related to an application of Dieter Leypold et al, Ser. No. 629,284, of the same title filed on even date herewith.

BACKGROUND OF THE INVENTION

1. Field of the Invention

This invention relates to a method for the comparative vector measurement of keyed radio signal pulses which arrive nearly simultaneously at several receiving stations, in particular Tacan pulses, which can exhibit great differences in level.

2. Description of the Prior Art

Particularly in position finding technology, the problem arises of measuring signal pulses, which signal pulses arrive at several receivers nearly simultaneously, according to amplitude and phase, such pulses having strongly fluctuating levels, so that the place of orgin of the pulse which is transmitted and received at several receivers can be precisely determined, particularly from the reciprocal phase relationships of the oscillations thereof.

In the German patent application P 2439612.1, published as Auslegeschrift 2439612 on July 3, 1975 and issued on Feb. 19, 1976, a method has been proposed for the reduction of the high possible level differences in the amplitude measurement of signal pulses which consists in that the pulses are fed to an attenuator which can be electronically adjusted in steps, as well as subsequently fed to a rectifier, and a control circuit is triggered by the pulses which, whenever a specific positive or negative threshold voltage of a pulse is exceeded, adjust the next following higher attenuation stage of the attenuator, and that a maximum value detector is triggered by the rectified pulses which, in attaining a positive or negative pulse maximum, switches through, for the purpose of evaluation, a signal level value derived from the position of the attenuator, on the one hand; and the ascertained maximum level to be interpolated in the areas between the adjusted stage of the attenuator and the stage no longer to be attained, on the other hand.

SUMMARY OF THE INVENTION

It is the object of this invention to provide a method for acquiring the reciprocal amplitude and phase values of the received signals of several receivers which are located in simultaneously arriving pulses, without a direct measurement of the amplitude and phase being necessary in each case.

A direct phase measurement of this type has the disadvantage that, for example, it cannot take place at a defined point in time, but must be carried out over a longer period of time.

According to the invention, this problem is solved in that, in each case of a receiver, the pulses are initially fed to an amplifier or attenuator having an amplification or an attenuation, respectively, which can be adjusted in distinct steps, the reduction or increase of which takes place automatically with the leading edge of the respective signal pulse. After passing through the amplifier or attenuator, respectively, of the receivers, the instantaneous amplitudes of the measuring signals are measured at a specific measuring time which is common to all receivers. A second measuring signal is produced in each receiver which is in phase quadrature with respect to the aforementioned measuring signal.

The relative amplitude and phase values of the vectors can be readily derived by computation from the two above-mentioned instantaneous amplitude values.

BRIEF DESCRIPTION OF THE DRAWINGS

Other objects, features and advantages of the invention will be best understood from the following detailed description taken in conjunction with the accompanying drawings, on which.

DESCRIPTION OF THE PREFERRED EMBODIMENTS

Figures 1, 2, 3, 4, 5:
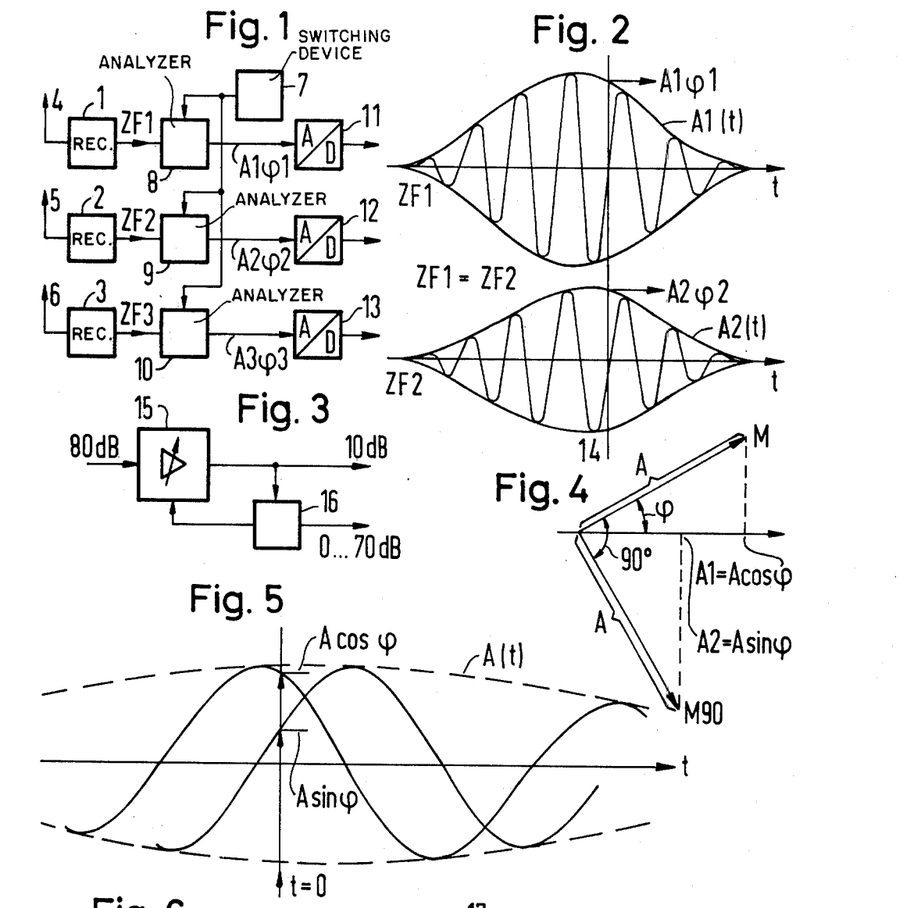
FIG. 1 is a fundamental block diagram of apparatus for amplitude and phase measurements of pulses to be used in connection with the present invention.
FIG. 2 is an intermediate frequency pulse diagram of two output signals of the receivers illustrated in FIG. 1.
FIG. 3 is a schematic block diagram of an intermediate frequency amplifier circuit having an amplification which can be adjusted in distinct steps; (shown more specifically in FIG. 30)
FIG. 4 is a vector diagram of a measuring signal in the intermediate frequency position.
FIG. 5 is a representation of an oscillogram of the measuring signal of FIG. 4.

Referring to FIG. 1, a fundamental arrangement for the amplitude an phase measurement of pulses is illustrated. At a defined point in time, the amplitude and phase of signals are to be measured, which signals are received nearly simultaneously in several receivers 1, 2 and 3. Each of the receivers has connected thereto a respective antenna 4, 5 and 6, and the antennas are installed so closely adjacent each other that the signals (for example, at 1 GHz) are received with different phases; however, the envelope of the pulses do not appear to be displaced.

In each of the receivers 1, 2 and 3, a conversion of the signals from the high frequency position (1 GHz) into the intermediate frequency position is also carried out. The signal amplitudes received can influence within wide limits, for example from 60-80 dB. The defined measuring time lies in the area of the maximum of the pulse envelopes. This time is processed by a specific switching device 7 (illustrated in detail in FIG. 27) and fed to three analyzers 8, 9 and 10 (illustrated in detail in FIG. 6, for example) which are assigned to the respective receivers 1, 2 and 3. After the measuring values for the amplitudes A1, A2 and A3, and the phases $\phi 1$, $\phi 2$, and $\phi 3$ have been ascertained, they are digitized in respective analog/digital converters 11, 12 and 13.

In FIG. 2, the intermediate frequency pulse diagrams of two signals at the 1 outputs ZF1 and ZF2 of the receivers 1 and 2 of FIG. 1 are illustrated one below the other. The intermediate frequencies ZF1 and ZF2 of both signals are equal and the two envelopes A1 (t) and A2 (t) appear simultaneously. The common measuring time is designated by the reference 14. At this measuring time 14, the amplitude A1 and the phase $\phi 1$ exists in the upper measuring signal A1 $\phi 1$, while the amplitude A2 and the phase $\phi 2$ are present in the lower measuring signal A2 $\phi 2$.

In order to reduce the possible high level differences, the arrangement according to FIG. 3 is employed, which arrangement is associated with one of the receivers 1, 2 and 3, respectively (FIG. 1) and makes use of an intermediate frequency amplifier 15, the amplification of which can be adjusted in distinct steps. The step adjustment is carried out by a change-over control 16 which gradually (in steps) reduces the amplification of the IF amplifier 15 during arrival of the leading edge of the signal pulse. If, for example, the arriving signals have a maximum level difference of 80 dB, and the IF amplifier 15 has seven switchable amplification steps of 10 dB, the level difference at the output of the IF amplifier is a maximum of 10 dB. An arrangement of this type is described in detail in the German patent application P 2439612.1 and is explained herein on the basis of the circuit illustrated in FIG. 30.

Figure 30:
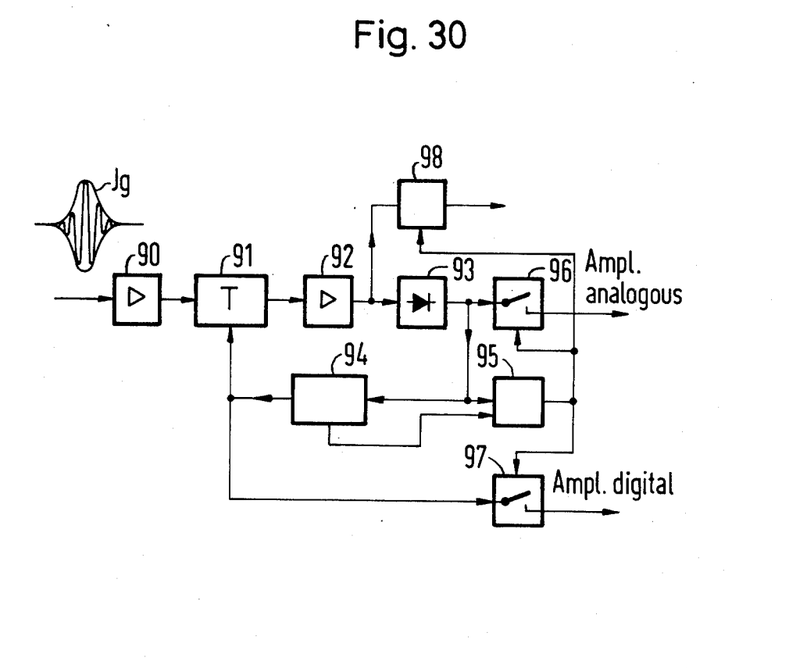
FIG. 30 is a block diagram for carrying out a pulse measuring operation according to a prior art technique.

Referring to FIG. 30, a block diagram for carrying out a pulse measurement procedure is illustrated in which a measuring signal in the intermediate position is fed into an attenuator 91 which can be adjusted in steps, via an intermediate frequency pre-amplifier 90 which exhibits a small amplification and whose sole purpose is the elimination of noise problems. The attenuator 91 is followed by an intermediate frequency main amplifier 92 having high amplification. The output signal of a rectifier 93 connected to the output of the main amplifier 92 is fed into a control circuit 94 and into a maximum value detector 95. The control circuit 94 consists of a threshold value detector and a counter. The maximum value detector 95 controls the opening times of two gate circuits 96 and 97. In an example for the purpose of explaining the method of operation of the arrangement according to FIG. 30, it is assumed that the receiving pulse Ig of median amplitude enters the input of the intermediate frequency pre-amplifier 90. The attenuator 91 is initially in the position of maximum sensitivity, i.e. 0 db. The leading edge of the pulse Ig rises and exceeds the voltage threshold of the threshold value detector in the control circuit 94. The exceeding of the threshold shifts the counter position of the counter in the control circuit 94 by one unit, whereby the attenuator 91 jumps from 0 dB to the next step, for example to + 10 dB. The voltage of the pulse Ig thereby again sinks to below the threshold value. With a further rise of the receiving pulse Ig, additional levels over the threshold result according to its amplitude—in conjunction with a corresponding increase in the attenuation position. This process is repeated until the maximum of the pulse Ig has been reached. At this point, the maximum value detector 95 responds. It produces a switchthrough pulse which further feeds the signal amplitude in a mixed digital-analog form to an additional analyzing device. The digital information is provided by the position of the attenuator 91 and is located at the output of the gate circuit 97, while the analog information serves the purpose of interpolation in the range of 10 dB, and is located at the output of the gate circuit 96.

It is important in the terms of operation of the apparatus that a step function signal from the control circuit 94 be fed to the maximum value detector 95, which step function signal prevents the erroneous maximum value read-out when there is a jump in attenuation. The intermediate frequency signal, which is present directly before the rectifier 93, is employed for the purpose of phase measurement, i.e. for the purpose of zero passage analysis. A zero detector 98, connected to the output of the main amplifier 92 need only master the dynamic range of 10 dB, i.e. a single step range of the attenuator 91. It is expedient if the phase measurement begins only subsequent to the output of the signal for the amplitude maximum, i.e. only after response of the maximum value detector 95.

Intermediate frequency band filters for the purpose of selection may be installed only in front of the attenuator 91. A filter behind the attenuator 91 would obliterate the switching jumps, and would cause an excessively prolonged switching opening which would have, as a consequence, an invalidation of amplitude and phase. The signal processing behind the attenuator 91 should therefore be as wide-band in type as possible.

FIG. 4 is a vector illustration and FIG. 5 is a representation of an oscillogram of a measuring signal in the intermediate frequency position. The following equation holds true.

$$M = A(t) \cos(\omega t + \phi) \quad (1)$$

where
$M$ is the measuring signal vector,
$A(t)$ is the pulse envelope,
$\omega$ is the angular frequency, and
$\phi$ is the phase angle.

The instantaneous amplitude corresponds to the projection of the measuring signal vector M onto the horizontal reference line in FIG. 4. This instantaneous amplitude A1, measured at a specific point in time, does not suffice in order to describe the vector. If, however, one produces a second vector which is shifted by 90°, $$M90 = A(t) \cos(\omega t + \phi - 90°)$$
$$= A \sin(\omega t + \phi) \quad (2)$$

and if one measures its instantaneous amplitude at the same point in time, the vector is described by two amplitudes, to wit:
$A1 = A \cos \phi$ (measured at, for example, $t = 0$)

$$A2 = A \sin \phi \quad (3)$$

If one observes two receivers having signals M1 and M2, of which the reciprocal phase is to be measured, the time of measurement can be freely selected. It is important only that the four instantaneous values be measured at the same time. The horizontal reference direction illustrated in FIG. 4 can be conceived as one of the two receiving signals. A shifting of the measuring time means a phase rotation of the measuring signal at both receivers by the same amount. Equal receiving frequencies are assumed.

Figure 6:
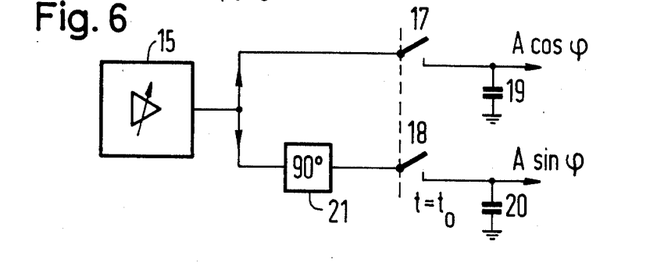
FIG. 6 is a schematic circuit diagram for a 90° rotation of a measuring signal including one analyzer of FIG. 1.
Figure 7:
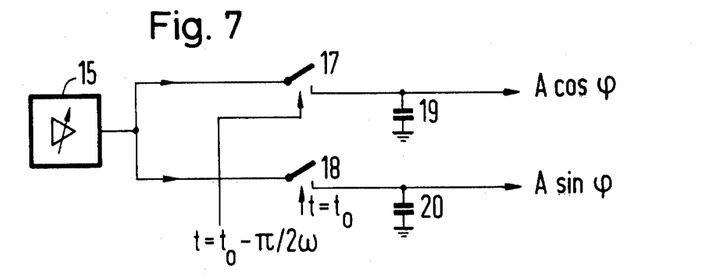
FIG. 7 is a schematic circuit diagram of a circuit similar to FIG. 6 for staggered switching times.
Figure 8:
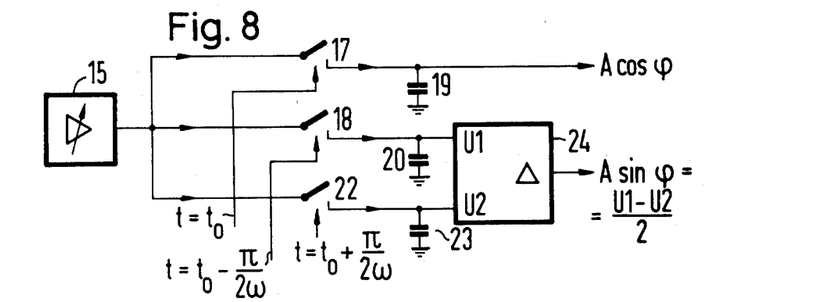
FIG. 8 is a schematic circuit diagram similar to FIG. 7 for increased staggered switching times.

Referring now to FIGS. 6-8, comparatively simple circuit constructions are illustrated. This direct method provides that two switches 17 and 18 which are connected to the output side of the IF amplifier 15 (having switch selected amplification) are opened at the measuring time and the instantaneous value remains stored in a respectively connected capacitor 19 or 20. The switches 17 and 18 must operate very rapidly and precisely. Expediently diode switches are employed for this purpose. The switches 17 and 18 obtain their opening signals at the measuring time from the switching device 7 (FIG. 1) which is illustrated in greater detail in FIG. 27.

Referring specifically to FIG. 6, a solution for a 90° rotation of a measuring signal is illustrated in which a 90° phase shifter 21 is connected between the output of the amplifier 15 and the switch 18 in one of the measuring signal paths. FIG. 6 illustrates one example of one of the analyzers 8-10 (FIG. 1). Other examples are illustrated in FIGS. 7, 8, 10, 12, 14, 15, 18 and 21-24. The IF amplifier 15 does not belong the analyzers 8, 9 and 10 illustrated in FIG. 1, but to the receivers 1, 2 or 3.

The arrangement illustrated in FIG. 7 has staggered switching times. The staggering of the switching times does somewhat contradict the requirement for a defined measuring time, so that when there are rapid signal alterations, possible errors in measurement could arise. However, at 4 MHz, staggering, for example, amounts to only 62.5 ns.

The circuit illustrated in FIG. 8 provides a remedy for eliminating errors which could arise with the circuit in FIG. 7. In FIG. 8 the sine component is measured twice and interpolated. This is accomplished by means of a pair of switches 18 and 22 which are operated 90° before or 90° after activation of the switch 17. The second sine value is stored in an additional capacitor 23 which is connected to the switch 22. An interpolation circuit 24 is connected to the switches 18 and 22 and the capacitors 20 and 23 to interpolate the signals such that $A \sin\phi = (U1 - U2)/2$.

A graphic illustration of an oscillation having staggered switching times corresponding to the operation of the circuit illustrated in FIG. 8.

Figure 10:
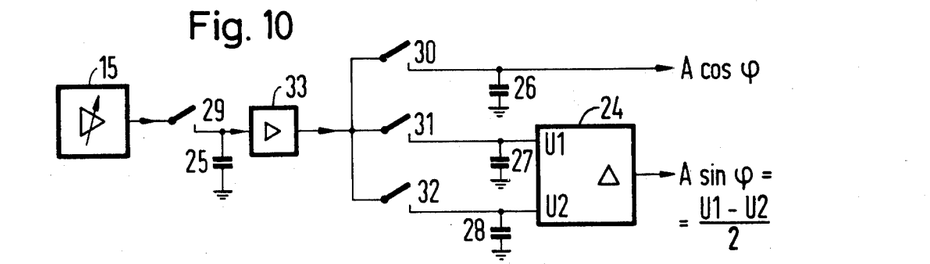
FIG. 10 is a schematic circuit diagram for instantaneous value storing utilizing a single rapid switch.

The costs in instantaneous value storing is in the fast operating switches. FIG. 10 illustrates a circuit in which this component is needed only once. In FIG. 10, a fast intermediate store 25, for example a capacitor, briefly stores the amplitude scanning values at the output of the IF amplifier 15 at the times $t_0 - \pi/2\omega$ and $t_0 + \pi/2\omega$. After the scanning process, the buffered storage value is transferred to the primary stores 26, 27 and 28. The primary stores 26, 27 and 28 are, likewise, capacitors. A switch 29 is provided for the purpose of keying-in the intermediate storage value, and the switches 30, 31 and 32 are provided for keying-in the primary storage values. The intermediately stored values are buffered by a buffer amplifier 33 which is connected between the primary store 25 and the switches 30, 31 and 32. Interpolation analogous to that in FIG. 8 takes place in the circuit 24 which is connected to the primary stores 27 and 28. Aside for economizing in keying-off switches, the circuit constructed in accordance with FIG. 10 makes possible significantly longer storage times, since considerably larger capacitors may be provided for the primary stores 26, 27 and 28, which capacitors can be loaded in the intermediate storage process, in comparison to the stores of the very rapidly variable intermediate frequency instantaneous value. The more expensive circuit control does not present any disadvantage, since it need be prepared only once for all simultaneously measuring receivers.

Figure 11:
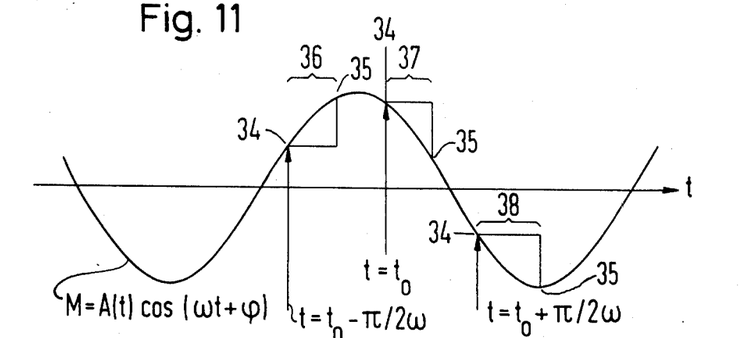
FIG. 11 is a graphic illustration of the time lapse of the circuit of FIG. 10.

FIG. 11 illustrates the time lapse of the arrangement according to FIG. 10. In FIG. 11 the opening times of the switch 29 has been provided with the reference character 34, and the closing times of the switch 29 have been provided with the reference character 35. During the interval 36, between an opening and a closing of the switch 29, the primary store 27 accepts the intermediately stored value by way of the switch 31. During the interval 37, the primary store 26 accepts the intermediately stored value via the switch 30. During the interval 38, the intermediate stored value is transferred to the primary store 28 by way of the switch 32.

In the operation of the circuit of FIG. 10 the following holds true:

$$\int_{t=t_0}^{t=t_0+\pi/\omega} A(t)\cos(\omega t + \Phi)d\omega t = 2A\sin(\omega t_0 + \Phi) \quad (4)$$

$$\int_{t=t_0-\pi/2\omega}^{t=t_0+\pi/2\omega} A(t)\cos(\omega t + \Phi)d\omega t = 2A\cos(\omega t_0 + \Phi). \quad (5)$$

Figure 12:
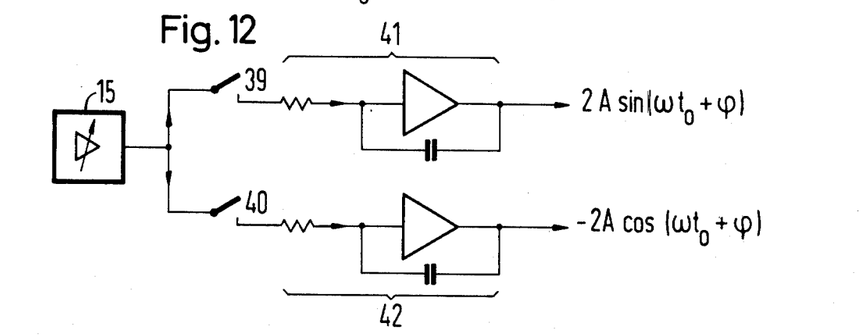
FIG. 12 is a schematic circuit diagram of apparatus for accomplishing certain integral functions.
Figure 13:
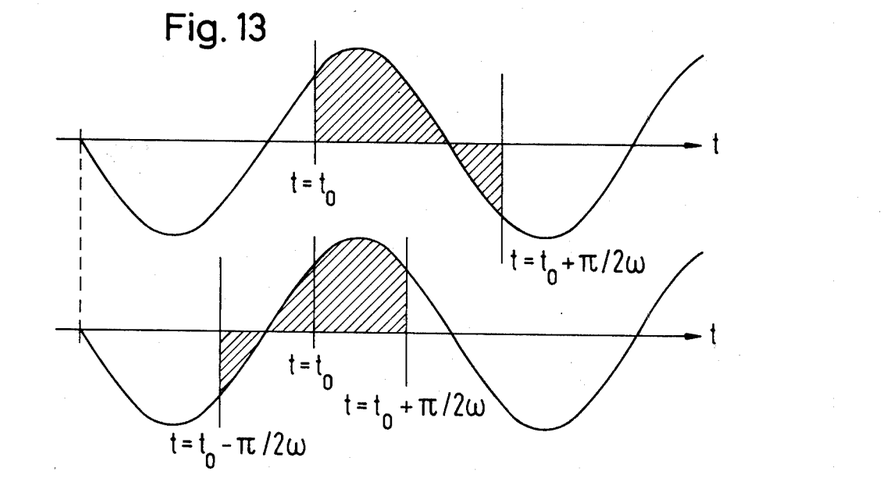
FIG. 13 is a graphic illustration of the time lapse of the circuit of FIG. 12.

FIG. 12 illustrates the technical utilization of the above integrals in a circuit, and FIG. 13 illustrates the time lapse for the circuit of FIG. 12. The requirement for the switching speeds of the switch 39 and 40 connected between the output of the amplifier 15 and the inputs of the integrators 41 and 42 is somewhat reduced with respect to the previously described methods of measurement. However, certain problems arise through the utilization of the integrators 41 and 42. Moreover, the integration intervals are somewhat staggered, which is undesirable in terms of the requirement for defined measuring time or measuring integral. The integration limits are characterized by the hatched areas in FIG. 13. The upper diagram in FIG. 13 applies to the integrator 41, and the lower diagram applies to the integrator 42. The integration limits in equations (4) and (5) represent an advantageous special case, namely that of maximum output voltage. In general, the integration limits can be random; both components need only have a defined length and be staggered to such an extent that two vector components perpendicular to eachother (sin $\phi$, cos $\phi$) result.

Figure 14:
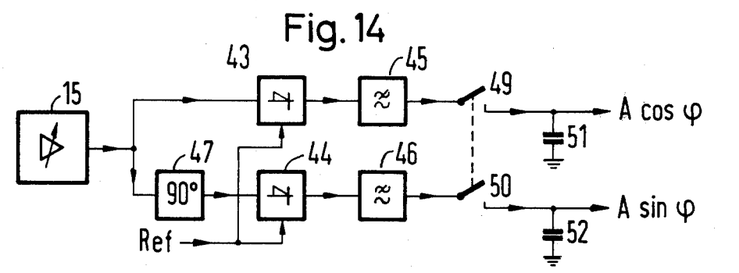
FIG. 14 is a block diagram of a measuring signal path which includes a 90° phase shifter in one branch thereof and wherein each branch includes a respective mixer which is fed with a reference signal of the same phase.
Figure 15:
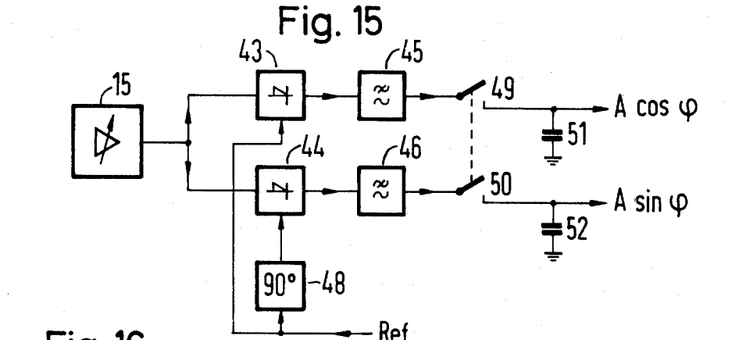
FIG. 15 is a block diagram of a measuring signal path similar to that of FIG. 14 in which each mixer receives a reference signal, one of the mixers being fed the reference signal by way of a 90° phase shifter.

The problem of the rapid variations in instantaneous value can be avoided by changing over from the IF position into a lower frequency position with a pair of mixers. Circuit for realizing this operation are illustrated in FIGS. 14 and 15, the arrangement according to FIG. 15 being preferred. Low pass filters 45 and 46 which are coupled to the respective outputs of the mixers are necessary for the elimination of higher mixing products.

In FIG. 14, a 90° phase shifter 47 is located between the output of the amplifier 15 and input of the mixer 44, and a common reference signal Ref is fed inphase to both of the mixers 43 and 44. In the circuit according to FIG. 15, however, both mixers 43 and 44 are controlled equally by the IF amplifier 15 (which has adjustable amplification), while the conversion reference signal Ref is fed to the mixer 44 by way of a phase shifter 48 and is fed directly, without phasing to the mixer 43. At the outputs of both measuring signal paths, the instantaneous values are stored in respective capacitors 51 and 52 by way of respective switches 49 and 50, which instantaneous values are available at the mixer inputs at the time of measurement.

Figures 16, 17:
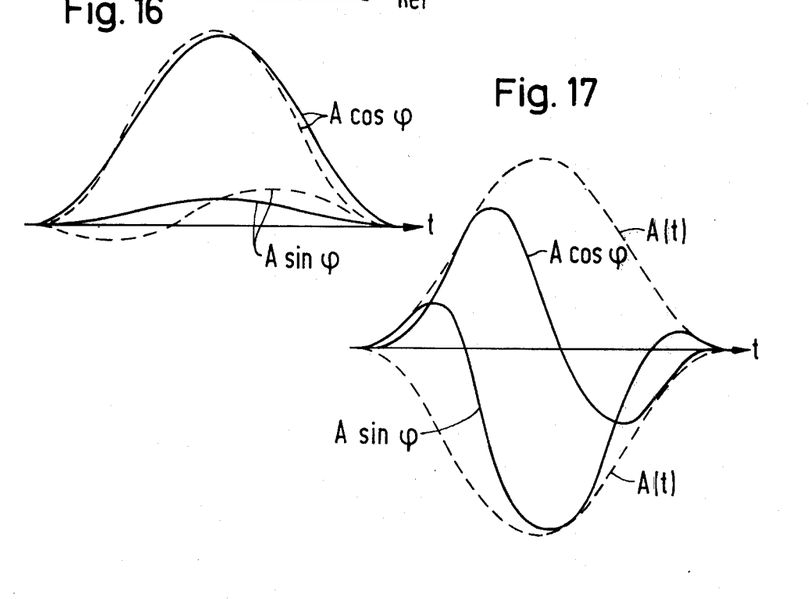
FIG. 16 is a graphic illustration of the output signals of the low pass filters of FIGS. 14 and 15 with a small phase rotation of about 20° within the pulse time due to varying frequencies.
FIG. 17 is a graphic illustration of the output signal of the low pass filters of FIGS. 14 and 15 with a phase rotation of approximately 360° within the pulse time.

FIGS. 16 and 17 illustrate the output signals of the low pass filters 45 and 46. In FIG. 16, the reference frequency is exactly equal to the IF center frequency. Here, the output signals for a small angle $\phi$ (circa 20°) are illustrated, i.e. A·cos$\phi$ nearly reaches its maximum value, while A sin$\phi$ is small and positive. The broken lines illustrate signal wave form when the IF center frequency does not precisely coincide with the reference frequency. The differential frequency resulting therefrom is best conceived at a constantly slowly rotating phase shift. The broken line in FIG. 16 illustrates the output signals of the low pass filters 45 and 46 when the phase rotates by about 20° within the pulse time due to varying frequencies.

The signal prior to the zero conversion is:

$$M_z = A_z(t)\cos(\omega t + \phi) \quad (6)$$

where $\omega$ represents the IF signal frequency.

The signal subsequent to zero conversion with the reference frequency $\omega_r$ is:

$$M_{01} = A(t)\cos[(\omega - \omega_r)t + \phi] \quad (7)$$

$$M_{02} = A(t)\sin[(\omega - \omega_r)t + \phi] \quad (8)$$

where $(\omega - \omega_r)t$ represents the phase uniformly rotating in time.

It is important that this phase rotation is the same for all receivers, since equal receiving frequencies are assumed. This phase relation is insignificant in the case of a phase comparison of receiver signals with respect to one another.

FIG. 17 illustrates a phase rotation of approximately 360° within the pulse. Under the assumption that the low pass filters 45 and 46 in FIG. 15 transmit the signals illustrated according to 17 without error, and that the keying-out switches 49 and 50 in FIG. 15 operate without objection, an error-free measurement value occurs also in the case of the signal shape corresponding to FIG. 17.

The mixture corresponding to the circuit illustrated in FIG. 15 can therefore lead to arbitrary frequencies. The reference frequency can lie above or below the signal intermediate frequency. Only one influence on the direction of phase rotation occurs. As long as the low pass filters 45 and 46, and the switches 49 and 50 process the signals without objection, error free test results are obtained.

In spite of this fact, the reference frequency is expediently selected in such a way that one obtains signals which are as low as possible at the output of the low pass filters 45 and 46, i.e. the reference frequency is selected equal to the median expected IF center frequency.

Figure 18:
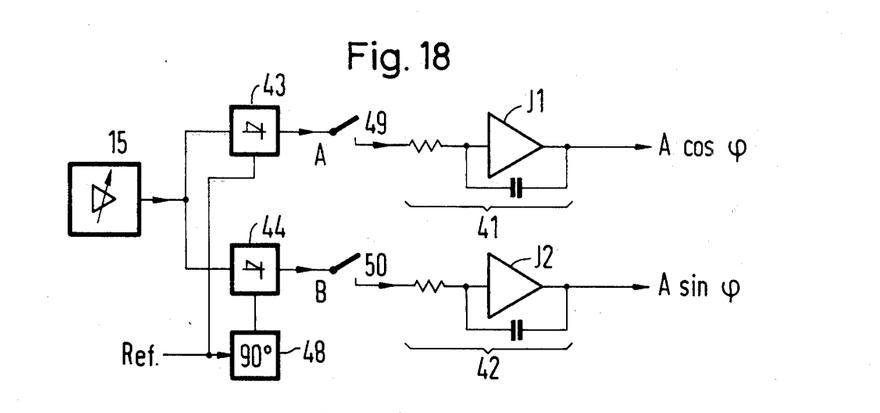
FIG. 18 is a block diagram similar to that of FIG. 15 with integration stages in each of the branches of the measuring signal path.

FIG. 18 illustrates a combination of the integral version and the zero frequency version. The output of the IF amplifier 15, which has switchable amplification, is connected to one input each of the two mixers 43 and 44 in the measuring signal paths, while the second inputs of the mixers 43 and 44 are fed by the IF reference voltage. A 90° phase shifter 48 is connected between the reference voltage and the second input of the mixer 44. The two switches 49 and 50, which both open at the time of measurement, are located at the outputs of the mixers between the mixers and the respective integrators 41 and 42.

Figure 19:
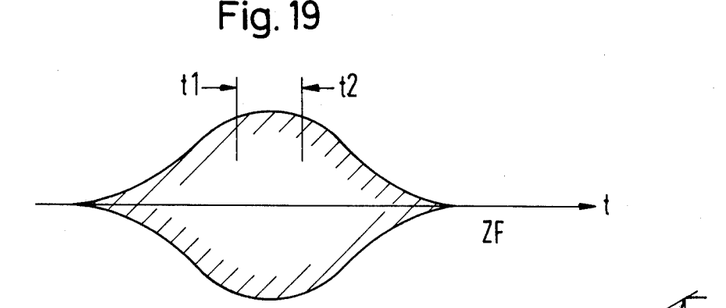
FIG. 19 is a graphic illustration of the integration zone of the intermediate frequency pulse signal from a time t1 to a time t2.

FIG. 19 illustrates the integration zone of the intermediate frequency pulse signal from the time $t1$ to the time $t2$.

Figure 20:
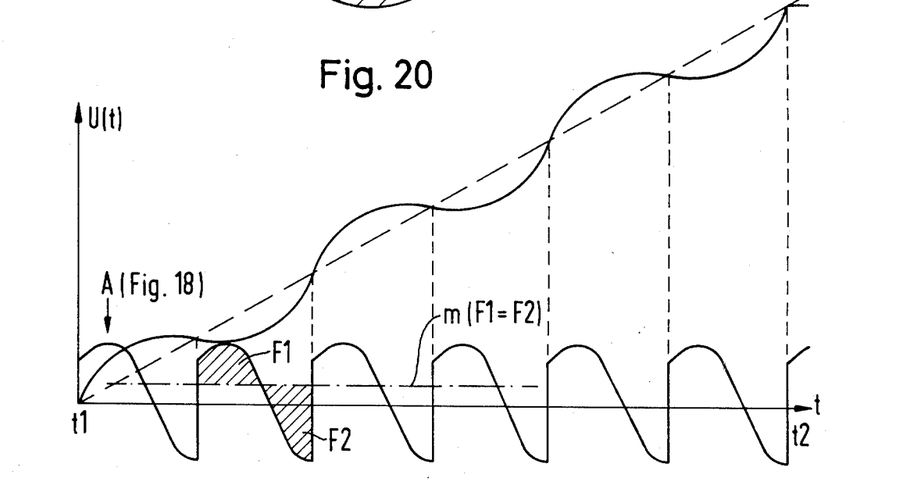
FIG. 20 is a graphic illustration of voltage plotted against time for an integration over three reference periods at a constant intermediate frequency amplitude.

FIG. 20 illustrates the special case of an integration over three reference intervals at a constant IF amplitude. FIG. 20 can be conceived as an enlarged section of the time zone from the time $t1$ to the time $t2$ of the intermediate frequency pulse signal illustrated in FIG. 19. The output signal A of the mixer 43 is commutated in co-phasal intervals of 180° by the reference frequency, wherein the mixer 43 takes the form of a ring modulator. At the output of the integrator 41 a wave occurs which winds about a straight line. The straight line corresponds to the integration of the direct voltage mean value m; therefore, the integration of a smoothed signal. It is important that the wave intersect the straight line at the end of a full integration interval, i.e. a smoothing for the purpose of eliminating the integration ripple is not necessary if the integration limits are selected as integral multiples of the reference half cycles.

Since the phase of the commutated signal in FIG. 20 was selected at random, the above statements apply not only to the outputs of the integrating amplifier J1 in FIG. 18, but also to the output of the integration amplifier J2. Corresponding to the mean value, which differs from the value of the output of the amplifier J1, a mean value straight line having a variable increase results for the value at the output of the amplifier J2. At the end of each full cycle, however, the wave also intersects its mean value at the integration output for the value at the output of the amplifier J2. The advantage of this combined integration method, as compared to the pure interval integration according to FIG. 12, resides in the fact that the switching-on times of the integration switch are significantly longer, and the switching edges thus need to be less accurately defined.

Some generalizations can still be made regarding the special case according to FIG. 20. The phase position of the integration limit with respect to the reference phase 0° or 90° is no consequence. Only an entire number of half cycles (full-wave mixers) or cycles (half-wave mixers) are required. The amplitude of the intermediate frequency is permitted to fluctuate within certain boundaries during the k integration interval. The reference frequency need not coincide exactly with the IF center frequency. The selected integration limits also eliminate ripples, which occur at the mixer output due to crosstalk of the reference signal.

A certain degree of difficulty in the conversion procedures consists in that—due to the small output voltage of the mixers, particularly of ring modulators—errors in measurement can arise, caused by zero-point off-set of the mixers of the amplifiers or integrators coupled at the output side. Phase angles extrapolated back from the two components $A \sin\phi$ and $A \cos\phi$ are more laden with error the smaller the signal components become. In the following, possibilities of reducing these zero-point errors are described.

If pulses with a very small keying ratio (several percent) are to be measured, the direct current error can be eliminated by means of isolating capacitors.

Figure 21:
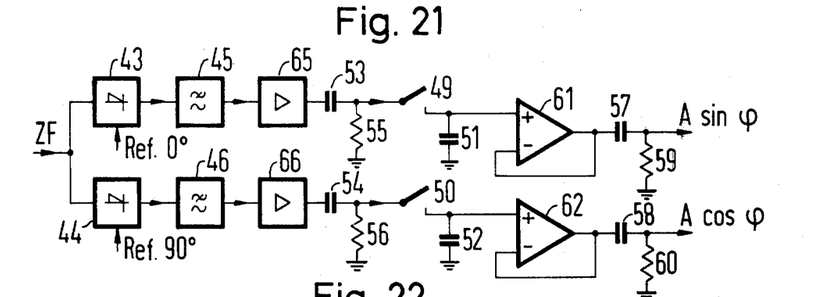
FIG. 21 is a block diagram of an arrangement for eliminating a direct current error in measuring pulses having a very small keying ratio.

FIG. 21 illustrates an embodiment constructed for this purpose. Either the high pass filters having the capacitors 53, 54 and the resistors 55, 56, or the high pass filters having the capacitors 57, 58 and the resistors 59, 60 are installed in the measuring channels, in connection with the buffer amplifiers 61 and 62. The second possibility has the advantage, in that all zero errors are eliminated, even those of the isolation or buffer amplifiers 61 and 62. However, this method is only practical if, in consideration also of the storage time, the stored output signal also has a small keying ratio. However, in practice, the interval between two measuring pulses is often used for signal storage. Moreover, an amplifier 65 and an amplifier 66 is provided in a respective measuring channel.

Figure 22:
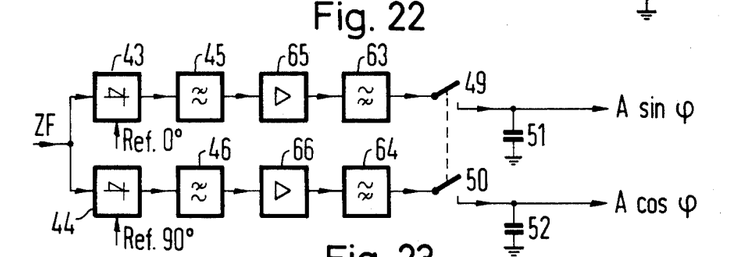
FIG. 22 is a block diagram of an arrangement of eliminating the zero error for pulses of rapid succession.

If the receiving pulses come in rapid succession, this method of zero point stabilization fails. In this case, the zero error can be eliminated by deliberately changing over to an intermediate frequency differing from zero, so that a pulse approximately like that of FIG. 17 results. FIG. 22 illustrates an advantageous circuit embodiment for this purpose. A pulse of this type can be transmitted in the measuring signal channels free of the high pass filters 63 and 64. It is even permissible to select the boundary frequency of the high pass filters 63 and 64 to be so high that a noticeable phase shift occurs. If the high pass filters 63 and 64 are equally dimensioned in all receivers, these phase shifts do not cause any errors in measurement. In the circuit according to FIG. 22, each of the two measuring signal paths, operating dephased by 90°, comprises the mixer 43 or 44, the low pass filter 45 or 46, the amplifier 65 or 66, the high pass filter 63 or 64, the switch 49 or 50 which opens at the time of measurement, and the storage capacitor 51 or 52.

Clamping circuits provide the most accurate zero-point stabilization. These clamping circuits are based on the fact that the IF input of the mixers is switched off, and that the output voltage deviating from zero is stored in the capacitors having great capacity. This zero clamping must be carried out when no processing of the measuring values takes place.

Figure 23:
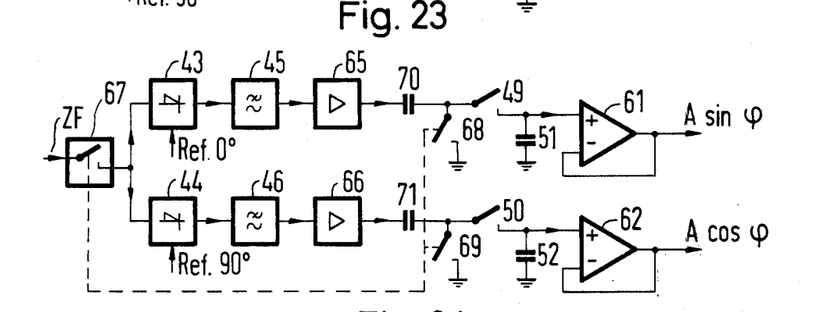
FIG. 23 is a block diagram of an arrangement for clamping prior to keying off switches.

FIG. 23 illustrates an embodiment according to which clamping is carried out prior to keying-off the switches 49 and 50. In the clamping process, one switch 67 is opened in the common input to the two mixers 43 and 44, and two switches 68 and 69 are grounded in the measuring paths. The capacitors having great capacity in the two measuring signal channels are designated 70 and 71, respectively. For the remainder, the circuit corresponds to that illustrated in FIG. 21, with the exception, however, of the high pass filters therein.

Figure 24:
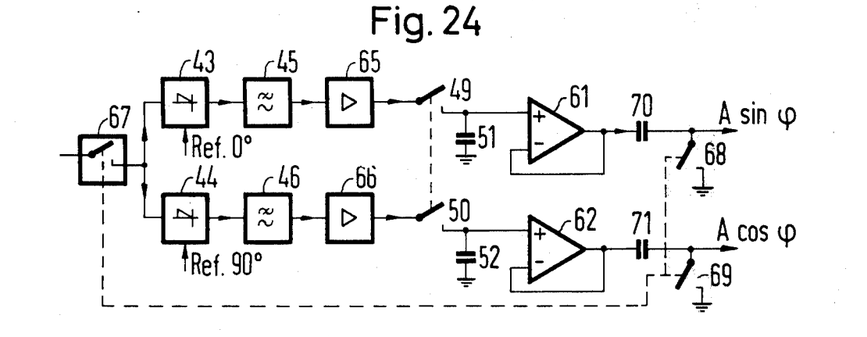
FIG. 24 is a block diagram of an arrangement in which clamping takes place only at the end of a switching train.

FIG. 24 illustrates a version for clamping in which clamping takes place only at the end of the paths by means of a pair of switches 68 and 69. The off-set voltages of the mixers 43 and 44, the amplifiers 45 and 46 and the scanning switches 49 and 50 are therefore comprised before the switches 68 and 69. This circuit operates with special precision if the scanning switches 49 and 50 are not simply short-circuited during the zero correction process, but if i the zero information is transmitted to the output of the circuit by means of a scanning process. The dynamic scanning error can therefore also be corrected, which error arises when the control pulse of the switches 49 and 50 intersperses into the storage capacitors 51 and 52. In the case of missing signal pulses, a scanning zero correction of this type must be repeated in periodic intervals, in contrast with the possible static zero correction of the switches 49 and 50 when they are constantly kept closed.

Figure 27:
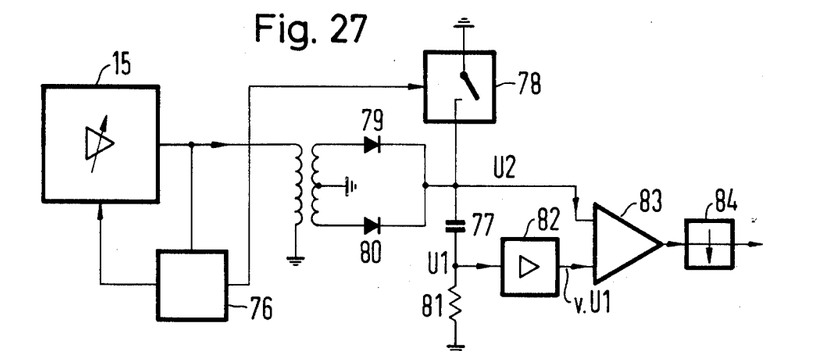
FIG. 27 is a block diagram of a leading edge discriminator which represents a switching device (illustrated as a block in FIG. 1) and which generates a switching signal for measuring during the leading edge in the range of the pulse maximum.

The application of the switched IF amplifier 15 can come into conflict with the intention of triggering the measuring process at the pulse maximum, at that point, in particular, when one switching value jump still enters shortly before the pulse maximum. In this connection, the utilization of a retarding or delay device was described in the aforementioned German patent application P 24 39 612.1. This logical solution is, however, comparatively expensive. In the following, therefore, a method is presented which avoids this expense. Instead of the retardation, a differentiation method is substituted, which device is illustrated in FIG. 27 and offers the possibility to obtain the measuring instant for the analyzers 8–10 (in FIG. 1) shortly before the pulse maximum at the leading edge of the pulse.

Figures 25, 26:
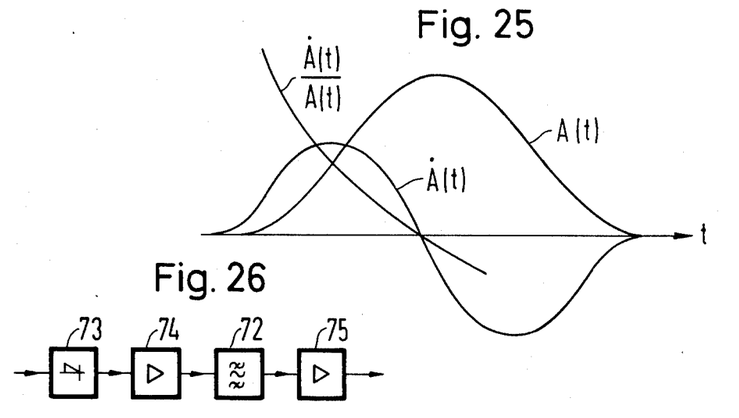
FIG. 25 is a graphic illustration of the typical process of a received pulse, its differential and its differential quotient.
FIG. 26 is a block diagram of a signal path having an IF filter adapted to the pulse form.

Referring to FIG. 25, a typical progress $A(t)$ of a receiving pulse is illustrated, as well as the differential quotient Å (T). The amplitude-independent quotient Å (t)/A (t) is of interest. This quotient decreases continuously with increasing pulse amplitude. If it is possible to form this quotient, each point of the pulse curve A (t), independent of pulse amplitude, can be determined by comparing the amplitude-independent curve Å (t)/A (t) with a constant voltage. A high positive reference voltage therefore indicates points greatly preceding the pulse maximum; reference voltage zero denotes the point of the pulse maximum; negative reference voltage indicates beyond the pulse maximum. Expediently, a point on the curve preceding the maximum is utilized as a point for measuring the amplitude and the phase of the pulses which are entering the analyzers 8–10 in FIG. 1, so that the designation leading-edge discriminator is justified.

Figure 28:
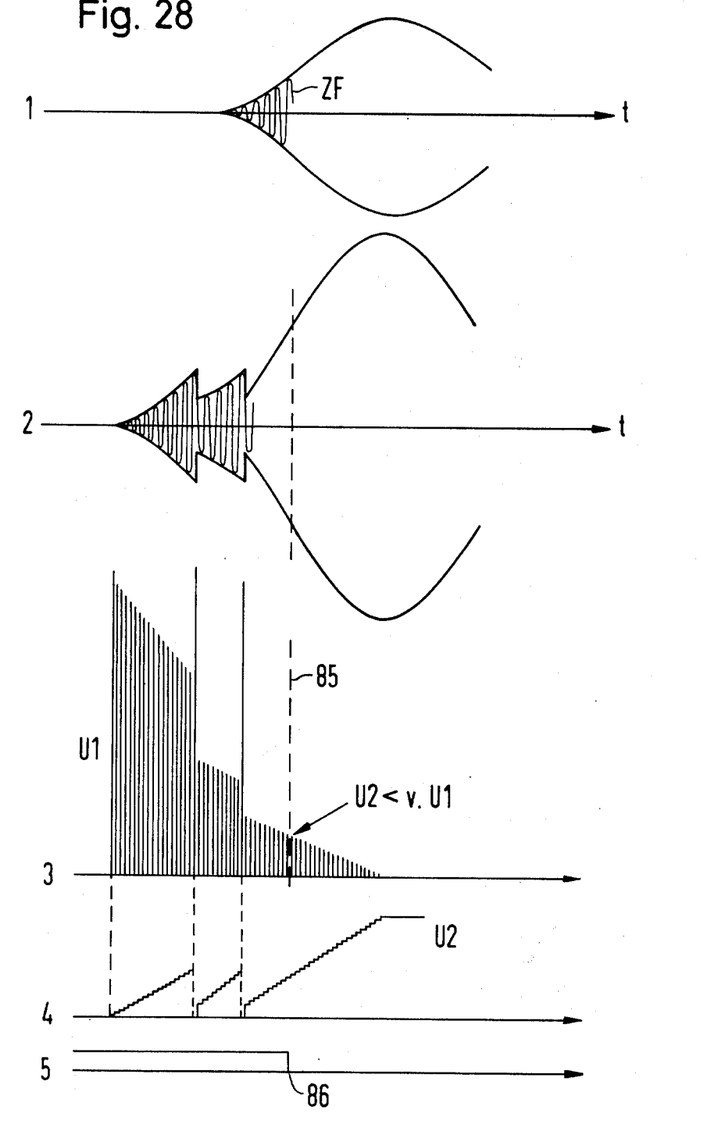
FIG. 28 is a graphic illustration of the functional work cycle of the circuit of FIG. 27.

Each sensitive pulse receiver has in its signal path an IF filter 72 adapted to the pulse form, as illustrated in FIG. 26, in front of which an input mixer 73 followed by an IF amplifier 74 are connected and behind which the IF main amplifier 75 is connected. The signal shape at the output of the filter 72 is nearly independent of its input signal. This applies particularly also to noise, so that a pure noise signal is not treated any differently than a receiving signal. The noise and the signal are wide-band in nature prior to the filter 72, and subsequently both are narrow-band. The filter 72 dictates the pulse shape. FIG. 27 illustrates an exemplary circuit of a leading-edge discriminator, that is a device for generating a measuring time at the leading edge of the pulses shortly before the pulse maximum, having a functional work cycle which is illustrated in FIG. 28. The input signal forms the output of the intermediate frequency amplifier 15 connected via the control 76. The control 76 comprises a threshold value detector and a counter corresponding to the change-over control 16 in FIG. 3. The amplifier 15 and the control 16 are parts of the receivers 1–3 illustrated in FIG. 1. As long as no signal is present, a capacitor 77 is short circuited via a switch 78. When a signal arrives, for example, when exceeding a minimal threshold, the switch 78 opens. Two diodes 79 and 80 at the output of the IF amplifier 15 produce charge surges which originate as voltage pulses U1 at a resistor 81, and which charge-up the capacitor 77 to the voltage U2. The time constant of the capacitor 77 and the resistor 81 is small with respect to the IF period. The voltage pulses U1 are amplified by means of an amplifier 82 and compared in a comparator 83 with the staircase voltage U2. As long as the amplified pulses v.U1 are greater than the voltage U2, pulses originate at the output of the comparator 83 and are fed to a monostable multivibrator 84. The operating time of the monostable multivibrator 84 is greater than the duration of a half cycle. If the voltage U2 has increased to an extent that the pulses v.U1, which become steadily smaller with progressive approximation to the pulse maximum, no longer attain the voltage magnitude of the voltage U2, no further pulses arise at the output of the capacitor 83. The multivibrator 84 flops at the end of its operating time. This flop indicates the desired pulse location, i.e. the measuring time for the analyzers 8–10 in FIG. 1. The switching steps of the attenuator 76 signify a certain degree of difficulty. This problem is solved in that the switch 78 short circuits with each attenuation jump. The following high recharge surge U1 prevents, with certainty, flop of the monostable multivibrator 84. The circuit point for the voltage U2 must again be recharged from zero on.

The selected double path control having the diodes 79 and 80 is not absolutely necessary. The circuit also operates by eliminating the diode 80. The selection of double path rectification or single path rectification depends on how high the IF center frequency is in comparison to the pulse time. In the method illustrated, the IF center frequency determines the differential interval between which the voltage variation of the voltage U2 is measured at the capacitor 77.

The work cycle illustrated in FIG. 28 shows an IF pulse in the first line; an IF pulse after the IF amplifier 15 in the second line; the voltage U1 in the third line; the voltage U2 in the fourth line; and, in the fifth line, the behavior of the monostable multivibrator 84. The point in time at which the voltage U2 becomes greater than the voltage of the recharge pulse v.U1 is illustrated at 85. The point in time, shortly thereafter, at the flop of the monostable multivibrator 84 is indicated at 86.

Figure 9:
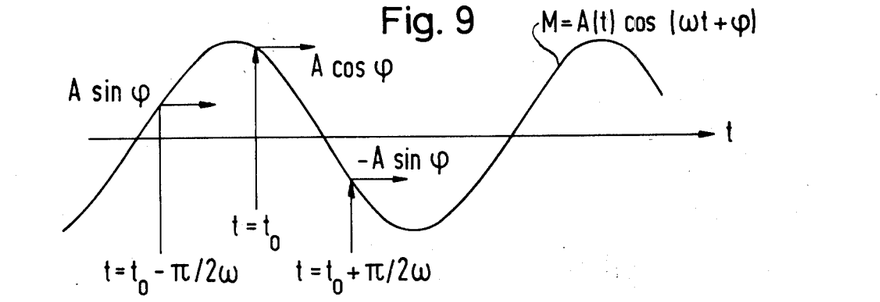
FIG. 9 is a graphic illustration of an oscillation with staggered switching times.
Figure 29:
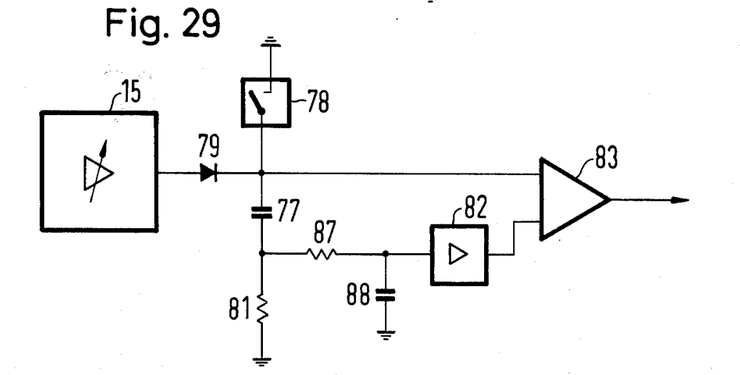
FIG. 29 is a block diagram of a leading edge discriminator for use at high intermediate frequencies.

The circuit according to FIG. 27 fails under extremely low intermediate frequencies, and becomes inexpedient at high intermediate frequencies. Under high intermediate frequencies, the circuit according to FIG. 29 is recommended which, for the most part, coincides with that of FIG. 27. In FIG. 9, the charge surges are averaged prior to amplification. The time constant of an RC circuit having a resistor 87 and a capacitor 88 is large with respect to the intermediate frequency period; however, it is small with respect to the pulse length. A monostable multivibrator, such as the multivibrator 84 in FIG. 27, can be eliminated in this method of measurement.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method of comparative vector measurement of keyed radio signal pulses, in particular DME pulses, arriving nearly simultaneously at several receivers and which can have great level differences, comprising the steps of:
    feeding the received pulses to a variable signal transfer function circuit and automatically reducing the signal level in response to the rising of the leading edge of a respective signal pulse;
    measuring the instantaneous amplitudes of the transferred signals at a fixed time common to all receivers;
    producing second measuring signals corresponding to and in phase quadrature to the measured transferred signals; and
    measuring the instantaneous amplitudes of the second signals at the same time as the measuring of the transferred signals.

2. The method of claim 1, wherein the received pulses are fed to an amplifier having a stepped amplification characteristic and the step of varying the transfer function is further defined as varying the amplification of the amplifier in steps.

3. The method of claim 1, wherein the received pulses are fed to a step-variable attenuator and the step of varying the transfer function is further defined as varying the attenuation of the attenuator.

4. The method of claim 1, comprising the step of converting the radio frequency pulses to the intermediate frequency position prior to measuring.

5. The method of claim 4, comprising the steps of:
    converting to a frequency of about 0 Hz the signals previously transposed to the intermediate frequency position by mixing the same with the intermediate frequency in respective mixers operated in phase quadrature; and
    storing the resulting mixing signals.

6. The method of claim 5, comprising the step of:
    integrating the results of mixing prior to storage.

7. The method of claim 1, comprising the step of storing the measured signals.

8. The method of claim 1, comprising the steps of:
    integrating the measured signals; and
    storing the integrated values.

9. The method of claim 1, wherein the steps of feeding and automatically varying the signal transfer function are further defined by the steps of:
    differentiating a signal phase with a leading-edge discriminator to determine the moment at which the signal pulse exhibits a defined fractional part of its maximum amplitude; and
    blocking the transfer function circuit for a predetermined time before permitting the circuit to feed out a measuring instruction.

10. The method of claim 1, comprising the step of:
    deriving the amplitude and phase values of the vectors of the signals from the measured instantaneous amplitude values.

* * * * *